United States Patent [19]
Schade et al.

[11] Patent Number: 5,911,292
[45] Date of Patent: Jun. 15, 1999

[54] HIGH EFFICIENCY TORQUE TRANSMISSION ARRANGEMENT WITH RADIAL COOLANT FLOW

[75] Inventors: Volker Schade, Süssen; Hans Bässler, Eislingen, both of Germany

[73] Assignee: Schuler Pressen GmbH & Co., Germany

[21] Appl. No.: 08/850,238

[22] Filed: May 2, 1997

[30] Foreign Application Priority Data

May 4, 1996 [DE] Germany .......................... 196 17 951

[51] Int. Cl.⁶ .................................................. F16D 13/72
[52] U.S. Cl. ................................. 192/70.12; 192/113.34
[58] Field of Search ........................ 192/70.12, 113.36, 192/113.34, 113.3; 188/71.6, 264 D

[56] References Cited

U.S. PATENT DOCUMENTS

| | | | |
|---|---|---|---|
| 1,380,823 | 6/1921 | Matthews et al. | 192/113.36 X |
| 2,857,031 | 10/1958 | Fawick | 192/113.3 X |
| 3,580,369 | 5/1971 | Heck | 192/113.34 X |
| 3,860,100 | 1/1975 | Spanke et al. | |
| 4,146,116 | 3/1979 | Cumming | 188/71.5 |
| 4,269,289 | 5/1981 | Winkler | 192/113.36 X |
| 4,372,434 | 2/1983 | Aschauer | 192/113.34 X |
| 4,720,929 | 1/1988 | Umberson | 192/70.12 X |
| 4,736,821 | 4/1988 | Ries | 192/133.34 X |
| 5,174,420 | 12/1992 | DeWald et al. | 192/70.12 X |
| 5,495,927 | 3/1996 | Samie et al. | 192/70.12 |
| 5,575,363 | 11/1996 | Dehrmann et al. | 192/113.3 X |

FOREIGN PATENT DOCUMENTS

| | | |
|---|---|---|
| 0512252A1 | 11/1992 | European Pat. Off. . |
| 2800838A1 | 7/1978 | Germany . |
| 4342163A1 | 6/1995 | Germany . |
| 4407943A1 | 8/1995 | Germany . |
| 4444282A1 | 6/1996 | Germany . |

*Primary Examiner*—Charles A. Marmor
*Assistant Examiner*—Scott Lund
*Attorney, Agent, or Firm*—Evenson, McKeown, Edwards & Lenahan, P.L.L.C.

[57] ABSTRACT

A braking and/or clutch arrangement has a cooling system which is sealed off with respect to excess pressure. Liquid coolant is fed under pressure to friction elements and first comes in contact with the surface areas of the friction elements whose relative speed is the highest. The operating device required for operating the friction elements is connected with the clutch half which in the operation is subjected to lower rotational accelerations to reduce heat formation.

11 Claims, 3 Drawing Sheets

HIGH EFFICIENCY TORQUE TRANSMISSION ARRANGEMENT WITH RADIAL COOLANT FLOW

BACKGROUND AND SUMMARY OF THE INVENTION

The present invention relates to a torque transmission arrangement, and more particularly, to an arrangement for the influenceable transmission of torques between machine elements, particularly for transmitting braking or drive torques from or to a drive shaft of a press, having a first, rotatably disposed element and having a second element between which friction devices are arranged which can be engaged and disengaged in a controlled manner and to which a selectively controllable operating device is assigned, and having a cooling device which has a duct leading to the friction device for feeding a fluid coolant to the friction device as well as a space for removing the coolant from the friction device. The arrangement is used, for example, to non-rotatable couple machine elements with one another as necessary. In particular, the arrangement is provided as a braking and clutch device on mechanical presses, such as vehicle body presses for controlling the power flux from and to the plunger of the press.

Vehicle body presses are eccentric presses in which the eccentric is usually driven by way of a step-down gear whose input or drive shaft is connected with a drive source by a braking and clutch device. The drive source rotates continuously. A flywheel is provided on the drive source for the load buffering.

The braking and clutch device is a frictional clutch with friction elements which rub against one another during clutch engagement. The friction results in a rotational speed adaptation of the machine elements to be coupled and thus in their acceleration and/or deceleration, such that the friction elements heat up. Because of the frequent and regular acceleration and braking operations in vehicle body presses, a considerable power is converted so that the friction elements must be cooled.

DE 28 00 838 C2 describes a friction clutch and brake combination for presses which uses an open cooling circulating system. This arrangement has two multi-plate bundles which are disposed on a rotatably disposed shaft and which each contain a multi-plate group which is non-rotatably but axially displaceably coupled with the shaft. While one multi-plate bundle has a group of plates which a non-rotatably held on the outer circumference side, plates of the other multi-plate bundle are non-rotatably connected on the outer circumference side with a flywheel. A pneumatic cylinder of a large diameter and a very short length which is coaxial with respect to the shaft and resiliently prestressed is used for the operation.

A coolant duct which is arranged coaxially in the shaft and branches into ducts which extend radially to the outside in the area of the multi-plate bundles is provided for the cooling of the plates. These ducts are fanned out again and lead in each case by way of several outlet bores into the inner circumference area of the multi-plate bundles. For collecting the coolant thrown to the outside by the circulating braking and clutch arrangement by centrifugal force, a ring-shaped housing circulates with the flywheel and has mutually opposite front sides on which collecting bowls are provided for the removal of the thrown-out coolant.

DE 43 42 163 A1 describes a braking and clutch arrangement with two plate brakes for shifting a planetary transmission. The first brake called a multi-plate clutch transmits, as required, the supporting moment of the ring gear of the planetary transmission to a transmission case. The other multi-plate bundle called a multi-plate brake is used for coupling the planet carrier to the transmission case. The non-rotatably disposed plates are connected on their outer circumference side with the transmission case. The other multi-plate bundles are disposed on their inner circumference side on hollow shaft plate carriers. For the alternating operation of the plate brake, a non-rotating ring pistons is arranged between the multi-plate bundles and is axially movable by a pressure medium. For cooling the multi-plate clutch (brake), the housing has a ring-shaped water jacket. In addition, the plate carriers are provided with radial bores for transporting cooling oil through the multi-plate bundles in the radial direction from the inside to the outside.

U.S. Pat. No. 3,860,100 discloses a braking and clutch device. Two multi-plate bundles selectively connect a shaft with a housing or with a gear wheel which meshes with a drive shaft pinion. A ring-shaped piston, which is disposed in a ring-shaped recess of the housing which opens axially to one side and is arranged coaxially to the output shaft, is used as the operating device. The piston operates one of the multi-plate bundles by way of a tapered roller bearing. In all the above-mentioned conventional arrangements, however, the capacity to be stressed is limited by the heat development.

It is an object of the present invention to provide an arrangement for an influenceable torque transmission which has a high efficiency while its space requirements are low.

This object has been achieved in accordance with the present invention by fixing the flow direction and the guiding of coolant to extend through the multi-plate bundle from the outside to the inside, i.e., against the effect of the centrifugal force. Thereby, still cold coolant first arrives at the areas of the multi-plate bundles which are on the outside in the radial direction, where the highest speed difference and the largest power conversion occur. The increased cooling of the critical outside areas increases the efficiency, i.e., the achievable power dissipation of the arrangement.

Furthermore, as the result of the guiding of the coolant from the outside to the inside in accordance with the present invention, a low coolant pressure is achieved in the interior of the arrangement which facilitates the sealing between the shaft and the housing.

Preferably, the duct leading to the friction device and the duct leading away from the friction device form a cooling system which is statically sealed off to the outside and dynamically sealed off to the inside. The sealing-off of the cooling system against increased interior pressure takes place by a construction of the cooling-medium-carrying spaces which is closed to the outside, without the use of labyrinth seals, collecting bowls or rings for catching thrown-off oil. Slipping seals, such as lip seals or the like, are used as seals between moved parts. As a result, a simple and space-saving construction is achieved and the manufacturing costs are lowered.

Also, the present invention avoids sealing problems which would be the result of the use of no-contact seals because of the high required cooling oil flows. Thus, coolant flows which are naturally larger than oil flows, as used, for example, for the bearing of machine elements can be securely guided.

With the closed construction of the cooling system and the use of slipping seals of the present invention, the coolant can be transported through the multi-plate bundles (friction devices) at an increased pressure. This and the improved sealing permits the increase of the coolant flows, of the cooling effect and thus of the efficiency.

Advantageously, the brake and clutch elements (clutch halves) define a housing whose interior is filled with coolant (e.g., oil) preferably without any bubbles. An increase of the shearing work, i.e., dissipated power of the clutch, which occurs as a result of the oil filling, can be accepted, after we found that the complete filling of the housing with coolant effectively counteracts a foam formation and improves the cooling effect.

The cooling system of the present invention has a central coolant feeding by way of a coaxial connection piece. The connection piece has coolant ducts and, as needed, a pressure medium duct for the operating device whereby the guiding of coolant in a closed circulation and in any direction as well as with a hydraulic excess pressure is permitted.

The arrangement is preferably constructed as an outside-closing system. As a result, the operating device is connected with the outside element (the clutch half) which is operationally subjected to lower rotational accelerations or decelerations. During the pressing, this is the clutch half which is connected with the flywheel and which preferably has a plate carrier which is situated radially on the outside with respect to the multi-plate bundles. The mass moment of inertia of the drive shaft to be accelerated and braked is reduced to a minimum. Correspondingly, the dissipated power is reduced which occurs during the coupling with the flywheel. This arrangement permits a reduction of the required space or an increase of the power or torques to be transmitted. Because of an interposed step-down gear, mass moments of inertia of other elements, such as the eccentric drive, the slide, etc. have less influence.

A hydraulic operating device offers a fast response behavior and a high force development while the space requirements and weight are low.

BRIEF DESCRIPTION OF THE DRAWINGS

Other objects, advantages and novel features of the present invention will become apparent from the following detailed description of the invention when considered in conjunction with the accompanying drawings.

DETAILED DESCRIPTION OF THE DRAWINGS

Figure 1:
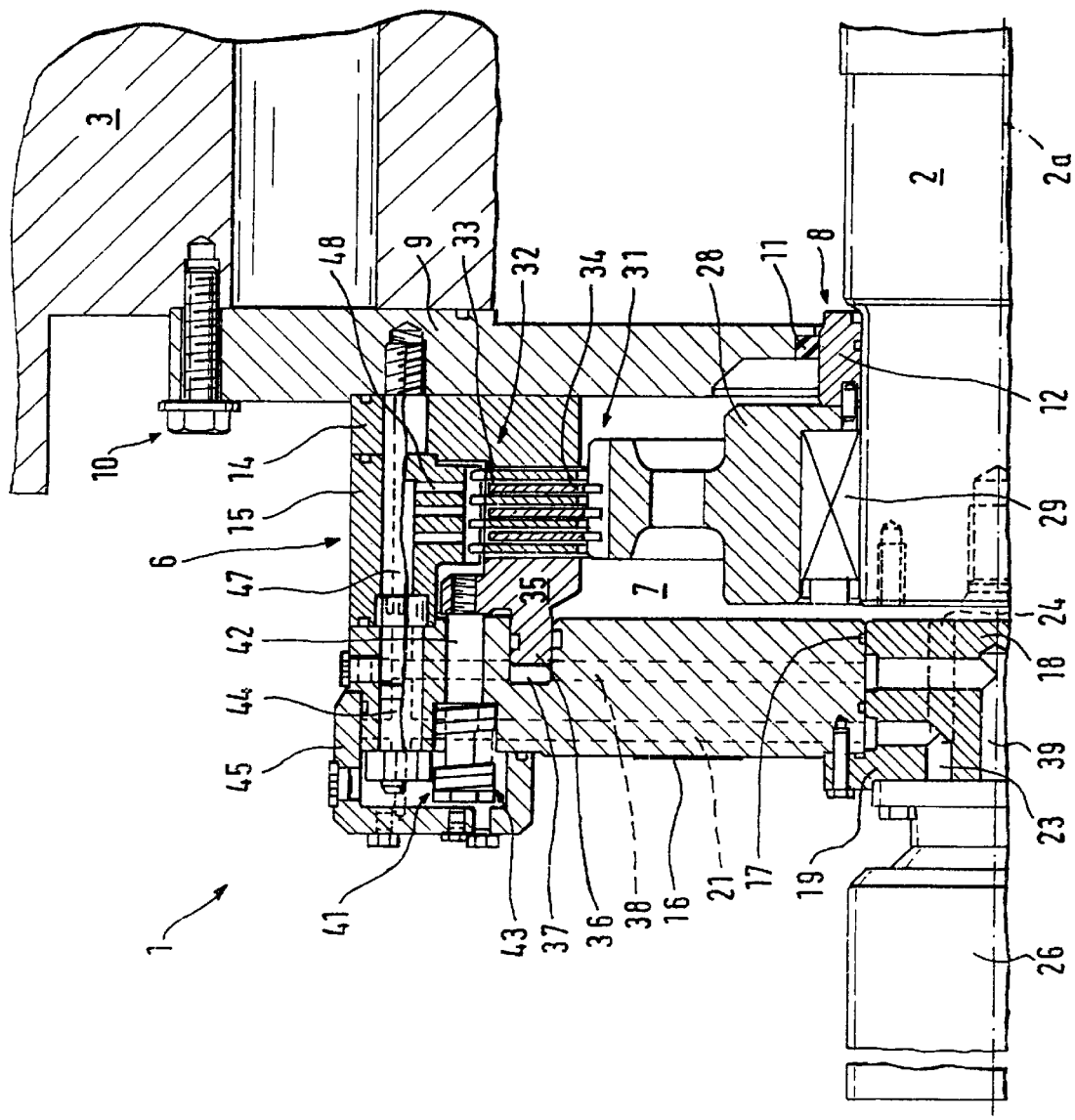
FIG. 1 is a longitudinal cross-sectional view of the basic features of a clutch device with a closed coolant circulating system for the coupling of a shaft with a flywheel, as needed.

FIG. 1 shows a clutch 1 which, as needed, is used for coupling a rotatably disposed drive shaft 2 with a flywheel 3 having a concentric axis of rotation. The clutch 1 is used for the controlled power transmission to the slide of a press for vehicle body parts as will be understood by one skilled in the art without the need for detailed illustration. Additional transmission elements, particularly a step-down gear, are arranged between the drive shaft 2 and the eccentric of the press slide.

The clutch 1 has an outside clutch half 6 which is coupled to the flywheel 3. This clutch half 6 forms a housing which is concentric to the drive shaft 2 and has an interior space 7 which is sealed off with respect to excess pressure. The clutch half 6 includes a plate 9 which has a central opening 8 and is connected with the flywheel 3 by pins 10. At the opening 8, the plate 9 has a sealing 11 which is accommodated on a ring shoulder and which seals off the interior 7 with respect to the shaft 2 guided through the opening 8. The seal 11 is, for example, a radial sealing ring whose sealing lip interacts with a ring 12 non-rotatably disposed on the shaft 2.

Coaxially with respect to the axis of rotation 2a, a housing ring 14 is non-rotatable with respect to the plate 9 and is non-rotatably connected with a ring-shaped plate carrier 15 which, in turn, carries an end plate 16. Coaxially with respect to the axis of rotation 2a, this end plate 16 has an opening 17 in which a connection piece 18 is situated which is held on the plate 16 by a flange 19. The connection piece 18 connects coolant ducts 21 which extend radially in the end plate 16 and are spaced with respect to one another. A duct 23 and a duct 24 connect the duct 21 and the interior 7 with a rotary feeding device 26.

While the outside clutch half 6 is defined by the housing formed by the plate 9, the housing section 14, the plate support 15 and the end plate 16, coaxially to the longitudinal center axis 2a, a second clutch half 28 is non-rotatably disposed on the shaft 2 by a tension set 29. On its outer circumference side, the clutch half 28 forms a plate carrier 31. The plate carrier 15 as well as the plate carrier 31 are provided with axially extending teeth which point to one another.

A multi-plate bundle friction device 32 is held between the plate carriers 15, 31 and has plates 33, 34 coupled alternately with the outer plate carrier 15 and the inner plate carrier 31 in a non-rotatable but axially displaceable manner. The plates 34 coupled with the plate carrier 31 are steel plates with crosswise extending cooling grooves which are milled into the friction surfaces. The plates 33 are steel plates with a sintered layer.

The clutch 1 is constructed to be closed on the outside. As an abutment for the multi-plate bundle 32, the housing section 14 has a plane pressure surface which rests against the plate 33 situated on the right side in FIG. 1. A ring-shaped, hydraulically operated piston 35 is arranged on the opposite side of the multi-plate bundle 32 and has a plane pressure surface and constitutes a selectively controllable operating device. The piston 35 has a ring-shaped axial projection 36 which is disposed in a sealed and axially displaceable manner in a coaxial, axially opening ring groove 37 in the end plate 16. The ring groove 37 therefore defines a "cylinder" for the piston 35 which can be acted upon by and relieved from pressure via a duct 38 extending radially in the end plate 16. By way of another duct 39 in the connection piece 18, the duct 38 is connected to the rotary feeding device 26.

A pull-back device 41 prestresses the piston 35 in a direction away from the multi-plate bundle 32. For this purpose, the piston 35 is connected with a set of axial connecting rods 42 which penetrate the end plate 16 at corresponding openings. With their end away from the multi-plate bundle 12, the connecting rods 42 are connected with one pressure spring 43 respectively which, on the other end, is supported on the end plate 16.

The ends of the connecting rods 42 which project over the end plate 16, as well as heads or fastening nuts of clamp bolts 44, which clamp the housing section 14, the plate carrier 15 and the end plate 16 against the plate 9, are covered by a ring-shaped cover 45 which is U-shaped as viewed along its longitudinal section.

The clutch 1 has a closed cooling system. Each of the radially extending ducts 21, which are arranged at angular distances in the end plate 16, leads into an axial duct 47 which, starting from the end plate 16, extends into the plate carrier 15. This plate carrier 15 has several radial outlet ducts 48 which lead out in the proximity of the outer circumference of the multi-plate bundle 32. The multi-plate bundle 32 is sealed off laterally by the ring piston 35 and the housing section 14 and constructed to be sufficiently wide so that coolant emerging from the outlet ducts 48 can find a path into the interior 7 only through the multi-plate bundle 32. The duct 24 constitutes an outlet leading out of the interior.

During operation of the clutch, the interior 7 is filled without bubbles with cooling oil. When the cylinder formed by the ring groove 37 is not acted upon by pressure, the piston 35 is in its withdrawn position and the multi-plate bundle 32 is not compressed. The clutch 1 will separate and the shaft 2 is not coupled to the flywheel 3.

When the piston 35 is acted upon by pressure by way of the duct 38, the piston 35 will press the multi-plate bundle 32 against the housing section 14. Thereby the plates 34 are taken along by the plates 33 which constantly circulate with the flywheel 3. By way of the duct 21, 47 as well as the outlet ducts 48, cooling oil is permanently under pressure fed to the multi-plate bundle 32. This cooling oil is pressed through the multi-plate bundle 32 against the operating direction of the centrifugal force and thus arrives at low pressure in the interior 7 from which it is led, by way of the duct 24, to the outside where it is cooled.

As the result of circulating the oil in this counter-centrifugal force direction, the still cold cooling oil first comes in contact with the outside areas of the multi-plate bundle 32 where, because the circumferential speed is the highest there, the outside areas have the highest heat development. The oil transport can take place at a relatively high pressure to also achieve a high oil flow which has a correspondingly good cooling effect. Because the multi-plate bundle 32 represents the main flow resistance, the interior 7 is essentially without pressure or has only a low pressure so that, without any major problems, the seal 11 ensures sufficient sealing. The elimination of dynamic seals in the outer area as well as the elimination of no-contact seals makes it possible to maintain a hydraulic excess pressure in the entire oil circulating system.

The arrangement of the hydraulically operated piston 35 on the outer clutch half 6 which is connected with the flywheel 3 and is therefore subjected to no significant rotational accelerations allows the clutch half 28 connected with the shaft 2 to be constructed with a low mass moment of inertia. The dissipated energy occurring during the acceleration of the shaft 2 (engaging of the clutch), is therefore lower and reduces heat generation.

Figure 2:
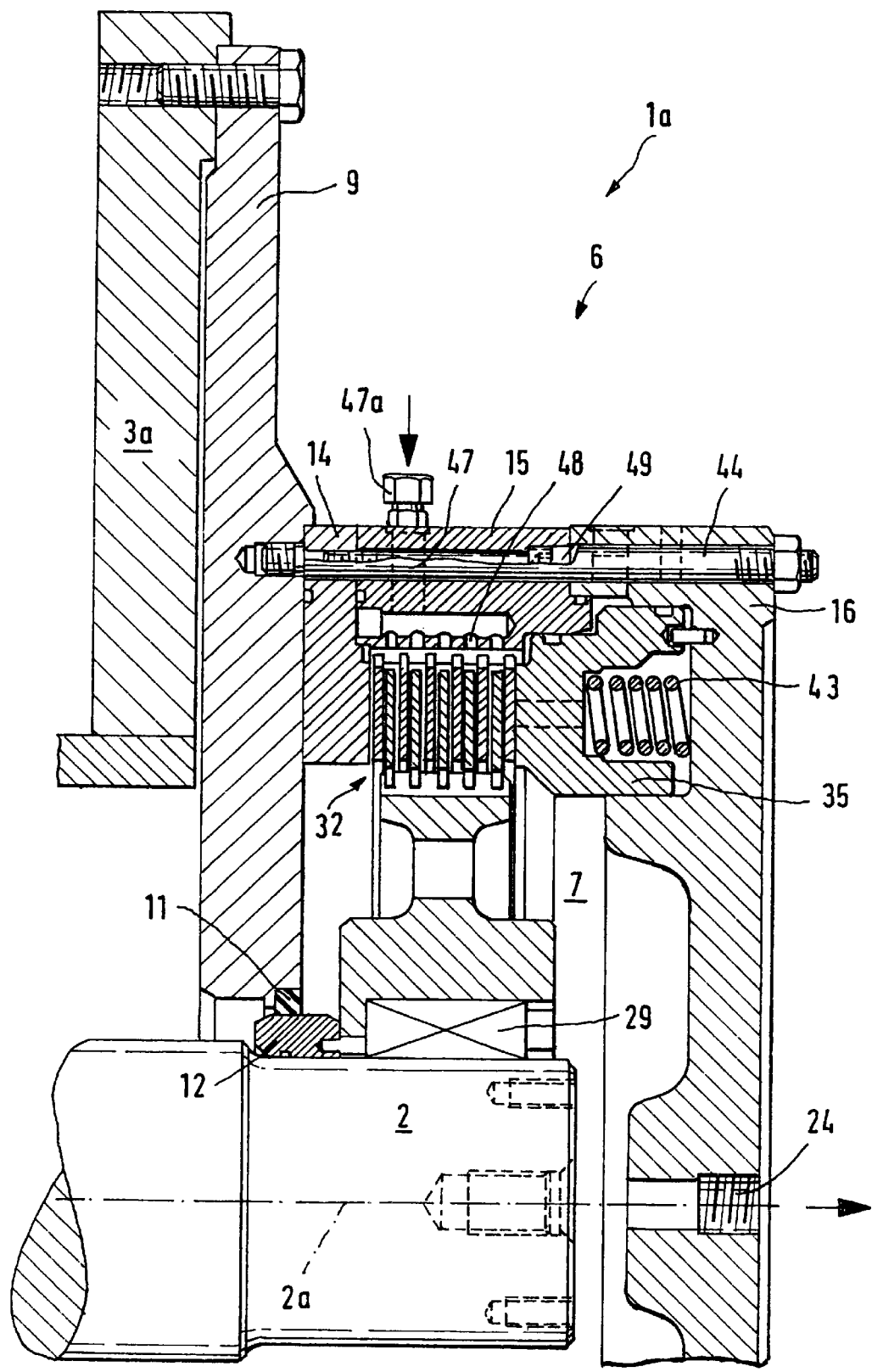
FIG. 2 is a longitudinal cross-sectional view of the basic features of a multi-plate brake with a closed cooling circulating system for the stopping of a shaft, as needed.

FIG. 2 illustrates a torque transmission arrangement which is constructed as a brake 1a also having a closed cooling system sealed off against excess pressure. Because of an extensive structural conformity with the clutch 1a, the following description is limited to the essential differences between the structures of FIGS. 1 and 2 for which reference is also made in connection with brake 1a to the description of the clutch 1.

Instead of being connected with the flywheel 3, the outside clutch half constructed as a brake housing 6 is connected with a stationarily disposed housing 3a. Thus, the housing section, the plate carrier 15 and the end plate 16, which are held together by way of the clamp bolt 44, are stationary. A connection 47a leads the duct 47 for cooling oil directly to the outside. As with the clutch 1, the duct 47 leads out by way of outlet ducts 48 at the outer circumference of the multi-plate bundle 32. The closed cooling system also includes the interior 7 which can be relieved from pressure by way of the duct 24 used as the outlet and provided in the end plate 16. The seal 11, which rests against the ring 12, is used for sealing off the interior 7 with respect to the shaft 2.

The brake 1a can be operated by way of the ring-shaped piston 35. The pressure springs 43 prestress the piston 35 toward the multi-plate bundle 32, i.e., toward the braking position of the bundle 32. By the admission of pressure into an annulus 49 formed between the piston 35, the plate carrier 15 and the end plate 16, the piston 35 can be changed into its release position, to relieve the multi-plate bundle 32 from axial pressure.

The arrangement according to FIG. 3 again is a clutch 1' which, however, is engaged in the inoperative position and has an outer clutch half 6 designed only for low rotational speeds or only for angle adjusting movements. This arrangement takes up an intermediate position between the clutch and the brake. The description of clutch 1 in FIG. 1 applies correspondingly to the clutch 1' of FIG. 3 but the clutch half 6 in the latter is not connected with a flywheel but other transmission devices, such as a worm gear or the like.

Figure 3:
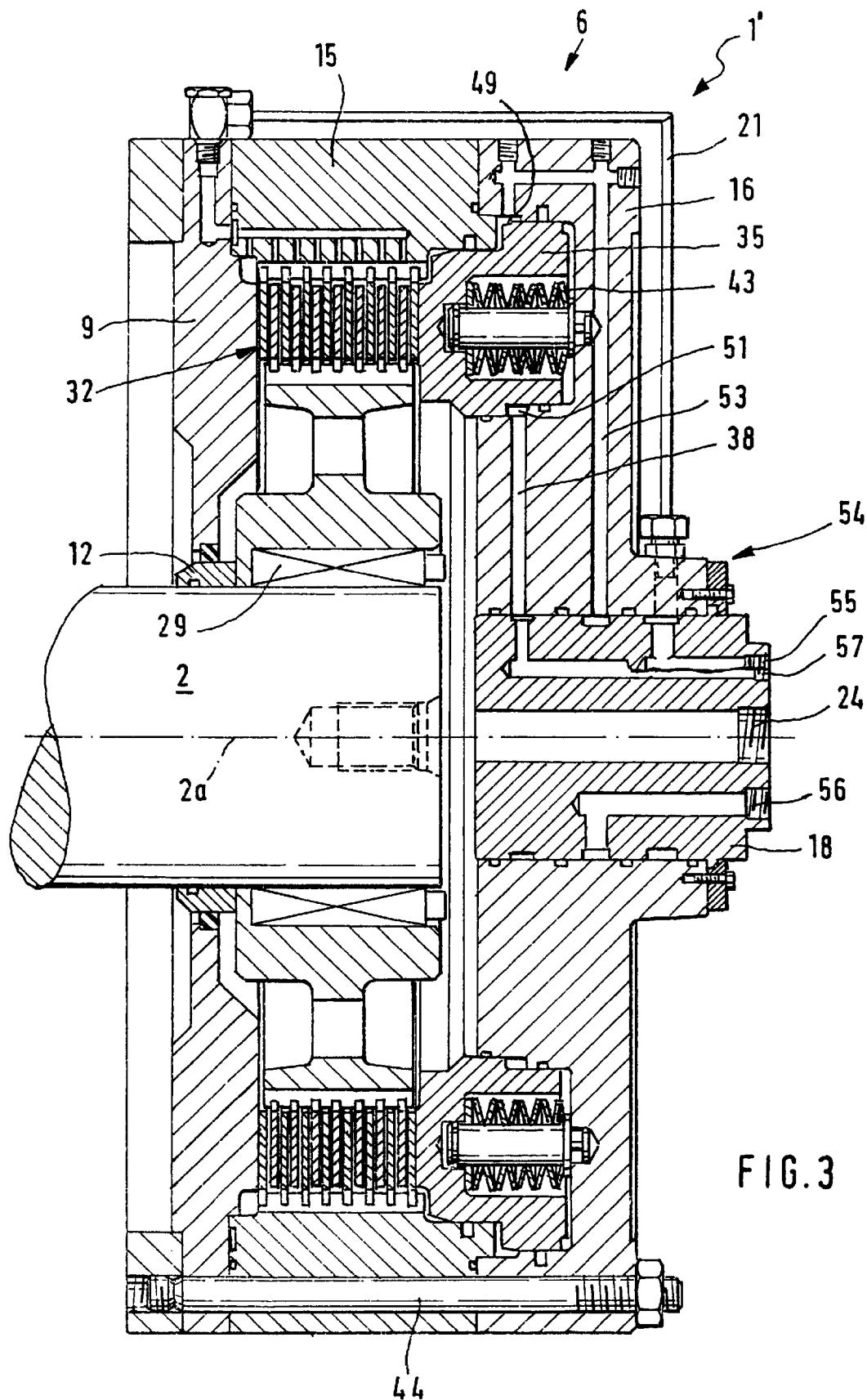
FIG. 3 is a longitudinal, cross-sectional view of another embodiment of a multi-plate clutch device with a closed cooling circulating system for the coupling of a rotatably disposed shaft with a stopped or slowly circulating housing.

The piston 35 in FIG. 3 is constructed as a double-acting piston and is prestressed by the pressure springs 43 toward its coupling position. When pressure is admitted, an annulus 49 which is defined by the end plate 16 and the plate carrier 15 changes the piston into its release position. When pressure is admitted, an annulus 51 defined between the end plate 16 and the piston 35 generates a force which aids the pressure springs 43.

The duct 38 leading into the annulus 51 and another duct 53 leading into the annulus 49 are arranged in a radially extending manner in the end plate 16 and terminate on the circumference of an opening centrally penetrating the end plate 16. The connection piece 18 is disposed in this opening and is held axially on the end plate 16 by a shoulder-ring connection or similar holding device 54. The end plate 16 is rotatable with respect to the connection piece 18. The connection piece 18 has a duct 57 which communicates with the duct 38 in each rotating position, and has a duct 56 which also, independently of the rotating position, always communicates with the duct 53. In addition, a duct connection 55 is constructed on the connection piece 18 and leads into the duct 21 constructed here as a separate line between the end plate 16 and the plate 9. This duct is used for feeding cooling oil to the multi-plate bundle 32.

In summary a braking and/or clutch arrangement according to the present invention employs a cooling system which is sealed off with respect to excess pressure. Liquid coolant is fed under pressure to friction elements and first comes in contact with surface areas of the friction elements having the highest relative speed. In addition, the operating device required for operating the friction elements is connected with the clutch half which in the operation is subjected to lower rotational accelerations to reduce heat generation.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Arrangement for transmitting torque to a drive shaft of a press, comprising a first, rotatably disposed element, a second element, a friction device arranged between the first and second elements so as to be controllably engageable and disengageable, a selectively controllable operating device operatively associated with the friction device, and a cooling device which includes a duct configured to feed a fluid coolant to the friction device and a space for removing the fluid coolant from the friction device, wherein the duct and the space are arranged so as to be acted upon by the fluid coolant such that coolant flow takes place through the friction device from a radially exterior side thereof to a radially interior side thereof, and a central rotary feeding device is provided for supply and removable of the fluid coolant to and from the cooling device at least for a clutch operation of the friction device.

2. The arrangement according to claim 1, wherein the duct and the space are configured to act as a cooling system which is sealed statically to an outside area of the arrangement and dynamically to an inside area of the arrangement.

3. The arrangement according to claim 2, wherein at least one slipping seal is operatively arranged to seal between relatively moving parts of the arrangement.

4. The arrangement according to claim 1, further comprising a housing having an interior filled with coolant during an operational mode and is sealed off to an outside area of the arrangement and containing the friction device.

5. The arrangement according to claim 1, wherein the operating device, the second element and the friction device constitute a closed system.

6. The arrangement according to claim 1, wherein the friction device comprises a multi-plate bundle having plates non-rotatably and alternately connected on an inside circumference thereof and on an outside circumference thereof with the respective first and second elements, and the plates non-rotatably connected on the outside circumference thereof with the second element are clampable by the operating device in an axial direction thereof against the plates non-rotatably connected on the inside circumference thereof with the first element.

7. Arrangement for transmitting torque to a drive shaft of a press, comprising a first rotatably disposed element subjected to a first rotational acceleration, a second element subjected to a second rotational acceleration different from the first rotational acceleration, a friction device arranged between the first and second elements so as to be controllably engageable and disengageable, a selectively controllable operating device operatively associated with the friction device, a cooling device including a first duct leading to the friction device for feeding or removing a fluid coolant to and from the friction device and a second duct for feeding or removing the fluid coolant to or from the friction device, a coaxial connection piece operatively associated with the cooling device for selectively feeding or removing the fluid coolant via the first and second ducts, and a central rotary feeding device operatively associated with the coaxial connection piece for feeding and removing the fluid coolant at least for a clutch operation of the friction device.

8. The arrangement according to claim 7, wherein the cooling device and the connection piece constitute a system which is sealed off to an outside area of the arrangement with respect to an increased internal pressure of the coolant.

9. The arrangement according to claim 7, wherein the operating device, the second element and the friction device constitute a closed system.

10. The arrangement according to claim 7, wherein the operating device is configured as a pressure actuatable hydraulic operating device operatively associated with a duct of the connection piece.

11. The arrangement according to claim 7, wherein the friction device comprises a multi-plate bundle having plates non-rotatably and alternately connected on an inside circumference thereof and on an outside circumference thereof with the respective first and second elements, and the plates non-rotatably connected on the outside circumference thereof with the second element are clampable by the operating device in an axial direction thereof against the plates non-rotatably connected on the inside circumference thereof with the first element.

* * * * *